United States Patent [19]

Vandermark

[11] 4,193,160
[45] Mar. 18, 1980

[54] SOLDER EVACUATION UNIT

[75] Inventor: Harold F. Vandermark, Blue Bell, Pa.

[73] Assignee: Nu-Concept Computer Systems, Inc., Colmar, Pa.

[21] Appl. No.: 840,190

[22] Filed: Oct. 7, 1977

[51] Int. Cl.$^2$ ............................................. A47L 5/02
[52] U.S. Cl. ................................... 15/341; 15/415 R; 228/20; 403/316
[58] Field of Search ................... 15/341, 344; 228/20; 43/110; 403/316; 15/415 R

[56] References Cited

U.S. PATENT DOCUMENTS

| | | | |
|---|---|---|---|
| 2,068,496 | 1/1937 | Linghammar | 15/415 |
| 3,921,249 | 11/1975 | Fortune | 15/341 |
| 3,965,608 | 6/1976 | Schuman | 15/341 X |

FOREIGN PATENT DOCUMENTS

| | | | |
|---|---|---|---|
| 317822 | 12/1919 | Fed. Rep. of Germany | 15/341 |
| 508621 | 7/1939 | United Kingdom | 15/341 |

*Primary Examiner*—Christopher K. Moore

*Attorney, Agent, or Firm*—Caesar, Rivise, Bernstein & Cohen

[57] ABSTRACT

A solder evacuation system for removing molten solder from multiple holes in a printed circuit board. The system comprises a hollow cup assembly adapted to contact the printed circuit board. The cup assembly includes a resilient mouth adapted to contact the circuit board and encircle the molten solder area. Conduit means are connected to the cup assembly and in communication with the interior thereof. A vacuum source is connected to the conduit means and is operative for instantaneously generating a vacuum. The vacuum source comprises a hollow cylinder having a piston therein and a port to which the conduit is connected. The piston is connected to spring means which are operative when enabled to instantaneously pull the piston down the cylinder to create the vacuum. Quick-acting latch means are provided coupled to the piston to enable the piston to be withdrawn by the spring instantaneously in response to the unlatching of the latch means.

8 Claims, 9 Drawing Figures

U.S. Patent  Mar. 18, 1980  Sheet 1 of 3  4,193,160
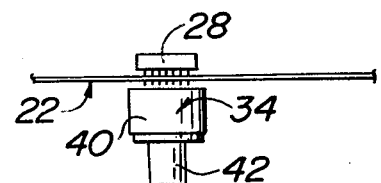
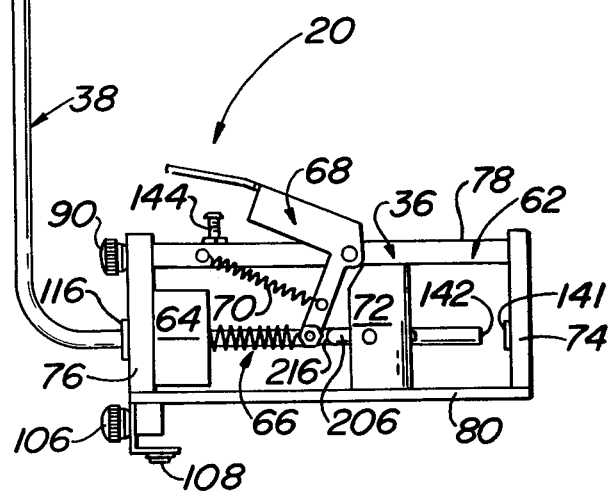
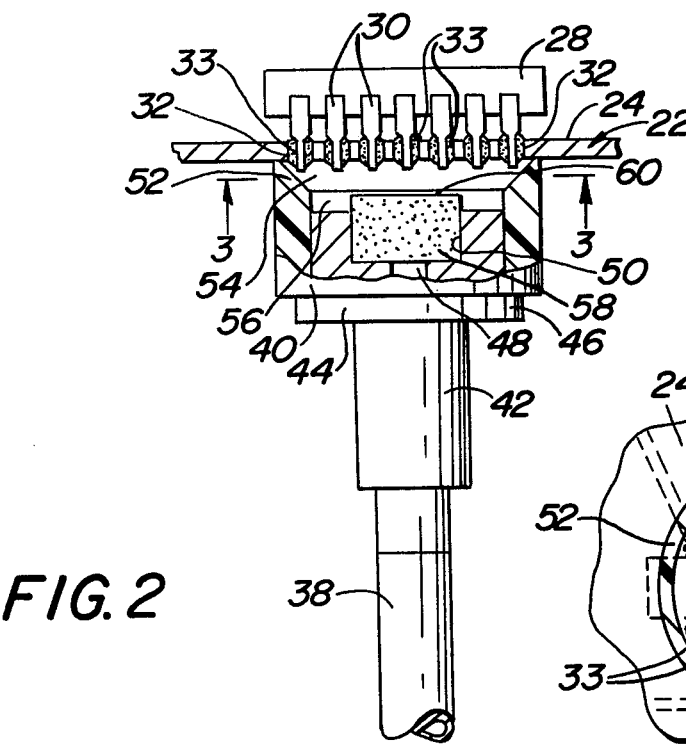
FIG. 1
FIG. 2
FIG. 3

SOLDER EVACUATION UNIT

This invention relates generally to apparatus for effecting the removal of solder from printed circuit boards and more particularly to apparatus for evacuating solder from plural holes in a printed circuit board in one operation.

Due to the ever increasing sophistication and concomitant expense of integrated circuit packs it is becoming a necessity that when an integrated circuit pack of a circuit board malfunctions that such component be removed from the board so that the board can be reused by the connection of a new component. Accordingly, there exists the present need for devices for facilitating the removal of integrated circuit packs from printed circuit boards and for clearing the holes in the circuit board of solder after the removal operation to render the board suitable for reuse.

In my U.S. Pat. Nos. 3,804,320 and 4,034,202 there are disclosed integrated circuit pack extracting tools which accomplish the task of removing an integrated circuit pack from a printed circuit board quickly, easily, safely and reliably. Heretofore, the removal of the solder from the holes of the board after the extraction of the integrated circuit pack has proved a difficult problem.

The prior art for removing solder from the holes of a printed circuit board after a component has been removed has generally entailed the following three techniques: (1) the application of a braided, thermally conductive material, such as copper wire, to the molten solder on the board to pull the solder from the holes, via capillary action, (2) the use of a vacuum to draw the solder from the holes, and (3) the use of air under pressure for blowing the molten solder from the holes. Such techniques have not proved viable for commercial operations. To that end, the apparatus for carrying out such techniques suffer from various drawbacks, the most serious of which being that such apparatus frequently only allows the removal of solder from one hole in a printed circuit board at a time. Furthermore, except for the technique of using the braided material it is necessary to provide air pressure or a vacuum source via external apparatus such as an air line, a vacuum transducer, a constant vacuum source, a hand operated squeeze ball or hand held, pre-cocked and latched piston and cylinder devices. Needless to say, such components render prior art solder evacuation systems complex and expensive.

Accordingly, it is a general object of the instant invention to provide a system for effecting the removal of solder from multiple holes of a printed circuit board in one quick and simple operation.

It is a further object of the instant invention to provide apparatus for instantaneously producing a vacuum at a portion of a printed circuit board to effect the extraction of molten solder from plural holes at said location.

It is still a further object of this invention to provide apparatus for the extraction of molten solder from holes of a printed circuit board and which apparatus is portable and foot actuated.

It is yet a further object of the instant invention to provide a simple and inexpensive device for producing an instantaneous vacuum at a portion of a printed circuit board to effect the removal of molten solder from holes therein.

It is yet a further object of the instant invention to provide a quick-acting latch assembly, particularly suitable for use in creating an instantaneous vacuum for a solder evacuation system.

These and other objects of the instant invention are achieved by providing apparatus for evacuation molten solder from holes in a printed circuit board. The apparatus comprises a hollow cup assembly for contacting the circuit board. The cup assembly inlcudes a mouth having a resilient lip which is adapted to contact the circuit board to encircle the molten solder area thereon and seal said area within the mouth. Conduit means are connected to the cup assembly and are in communication with the interior thereof. A vacuum source is connected to the conduit means and is operative for instantaneously generating a vacuum. The vacuum generating means comprises a hollow cylinder having a piston therein and a port to which the conduit is connected. The piston is connected to resilient means which is operative when enabled for instantaneously pulling the piston down the cylinder to create vacuum. Quick-acting latch means are coupled to the piston to enable the piston to be withdrawn by the resilient means in response to the unlatching of the latch means.

In a preferred embodiment of the invention the latch means comprises a block having first and second longitudinally extending passageways, a plunger haivng a chamfered recess in a portion of the periphery thereof and disposed within the first passageway, a transverse passageway and a ball disposed within the transverse passageway. A rod having a chamfered recess cut in a portion of the periphery extends within the second passageway. The transverse passageway communicates with the first and second passageways. The plunger is reciprocable within the first passageway between the second position wherein its recess is aligned with the transverse passageway and a first position wherein its recess is not aligned with the transverse passageway. The rod is reciprocable within the second passageway between a first position wherein its recess is aligned with the transverse passageway to a second position wherein its recess is not aligned with the transverse passageway. The rod is biased to said second position. The diameter of the ball is greater than the length of the transverse passageway such that when the plunger and the rod are within their respective first positions a portion of the ball extends into the aligned recess of the rod within the second passageway to lock the rod in place and when said plunger is moved to said second position the ball moves within the transverse passageway such that a portion of the ball extends into the aligned recess within the plunger and out of the recess within the rod to unlock the rod thereby enabling it to move to its biased second position.

Other objects and many of the attendant advantages of the instant invention will be readily appreciated as the same becomes better understood by reference to the following detailed description when considered in connection with the accompanying drawing wherein:

FIG. 1 is a side elevational view of the apparatus of the instant invention;

FIG. 2 is an enlarged sectional view of a portion of the apparatus shown removing the solder from holes in a printed circuit board to which an integrated circuit pack is connected;

FIG. 3 is a sectional view taken along line 3—3 of FIG. 2;

Figure 4A:
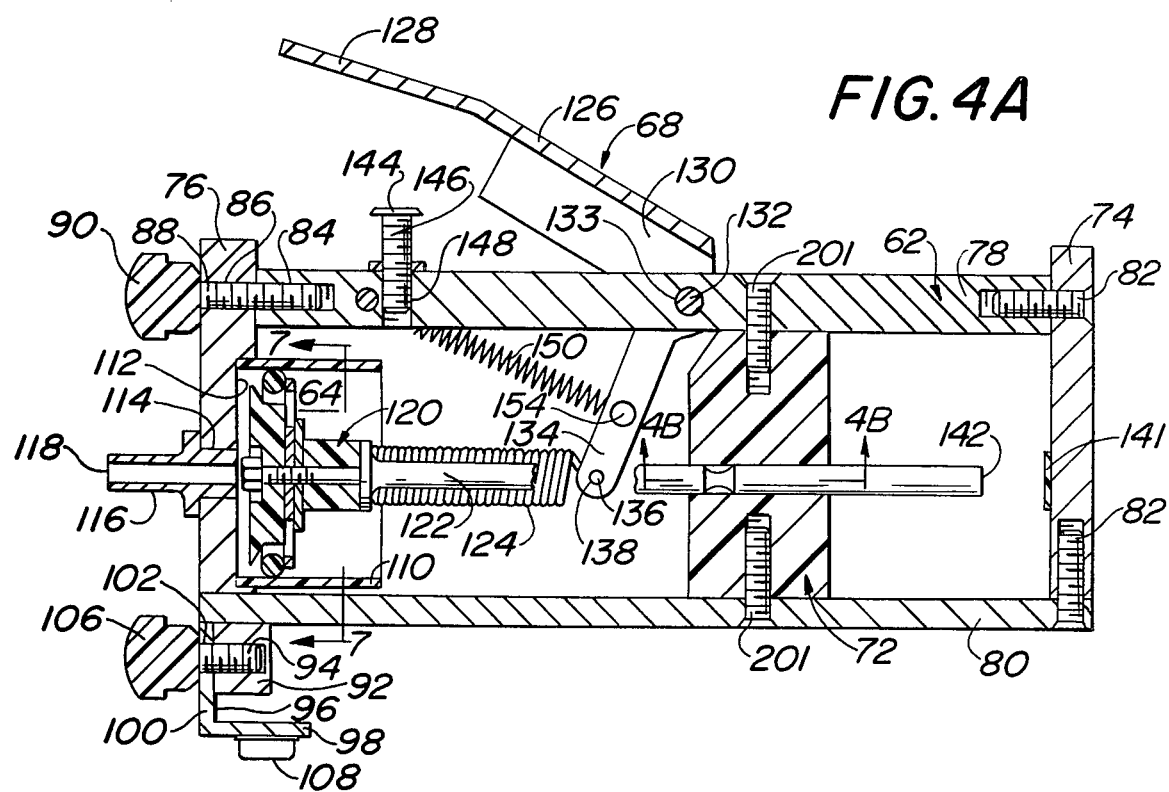
FIG. 4A is an enlarged vertical sectional view of a portion of the apparatus shown in FIG. 1 at the moment just before the creation of a vacuum.

Referring now to the various figures of the drawing wherein like reference characters refer to like parts, there is shown in FIG. 1 a system 20 for removing solder from a printed circuit board.

A typical printed circuit board, like one commonly used today, is shown in FIG. 3. As can be seen, the printed circuit board comprises a substrate 24 formed of an insulating material and upon which plural electrical conductors 26 are printed. A multipin integrated circuit pack, such as a dual-in-line pack 28 (FIG. 2) is mounted on the board and electrically connected to the conductors 26 thereof. To that end, each pin 30 of the pack 28 extends through a corresponding hole 32 in the circuit board and is soldered in place therein via solder 33.

In order to remove the pack 28 from the board 22 in the event that the pack malfunctions, it is necessary to apply heat to the pins of the pack to melt the solder while pulling the pack from the board. In my heretofore mentioned United States patents there are disclosed tools for removing integrated circuit packs from the printed circuit boards to which they have been soldered. While other types of desoldering tools, such as soldering irons, etc., can be used to melt the solder on the pins of the pack to enable the pack to be removed, the devices of my aforenoted patents are particularly suitable for such purposes since such devices in addition to effecting the melting of the solder, also clampingly engage the pack to enable it to be pulled from the board. Once the pack has been removed from the board the holes must be cleared of molten solder to ready the board for reuse. The system 20 of the instant invention effects the clearing of such holes quickly, easily and reliably.

As can be seen in FIG. 1, the apparatus 20 of the instant invention basically comprises a vacuum cup assembly 34, a vacuum source 36 and a flexible conduit 38 connected therebetween. The vacuum cup assembly 34 is arranged to be brought into contact with the underside of the circuit board at the location of the solder to be evacuated. Once the cup assembly is in position, as will be described in detail later and the solder melted, the vacuum source 36 is actuated, by means to be described later, to instantaneously create a vacuum. The vacuum is coupled through the conduit to the cup assembly 34 to effect the withdrawal of molten solder from the holes 32 in the printed circuit board, thereby readying the board for connection of another circuit pack.

Referring now the FIG. 2, the details of the cup assembly 34 will be considered. As can be seen, the cup assembly comprises a resilient ring-like member 40 into which a coupling 42 is disposed. The coupling includes a flange 44 abutting the back wall 46 of the ring-like member 40. The coupling includes a central opening 48 therein terminating in an enlarged diameter circular well 50. The peripheral edge 52 of the diameter 40 is tapered and forms the mouth 54 of the cup assembly and communicates with its hollow interior 56. A filter element 58 is disposed within the well 50. The element 58 is arranged to capture the particles of solder extracted during the operation of the system 20 since it is undesirable to allow such particles to travel through the cup assembly 34, connected conduit 38 and into the vacuum source 36.

The filter element 58 is made of a very porous material which does not have any through air passages so that it does not act as an impediment to the air flow yet effectively precludes the solder particles from passing therethrough.

As can be seen, the filter element 58 is of greater height than the depth of the well 50 to extend thereabove and thereby provide additional filtering surface area, ie., portions of its side surfaces as well as its top surface 60. This feature permits longer filter life while maintaining excellent flow capabilities through the filter and also eliminates the need for a chill plate.

The flexible conduit 38 is connected to the coupling 42 and is in communication with the hollow interior 56 of the cup assembly via the passageway 48 which opens to the bottom of well 50.

Use of the vacuum cup assembly 34 is as follows: the assembly 34 is located on the underside of the circuit board 22 so that the tapered edge 52 of the ring-like member 40 surrounds the holes to be cleared of solder. Owing to the resiliency of the ring-like member's edge, when the cup assembly is held tightly in place an airtight seal is created around the holes to be cleared.

It should be pointed out at this juncture that while the cup assembly 34 is arranged to be hand held in place on the underside of the circuit board during operation, mechanical means can also be used to hold the assembly in place.

Once the cup assembly is in place such that the seal makes sufficient initmate contact with the underside surface of the printed circuit board 22 removal of the pack 28 and clearing of the solder 33 from the holes 32 can be accomplished. To that end, when the solder 33 in the holes is in a molten state, such as occurs by the use of my aforementioned patented tools, the vacuum source 36 is actuated to instantaneously create a low pressure or vacuum at the mouth of the cup assembly. This action causes molten solder to evacuate the holes 32 as the outside atmospheric pressure rushes through the holes in an attempt to equalize the vacuum. The system continues to operate efficiently as long as the vacuum is of sufficient volume so as not to be satisfied by the air passing through the number of solder-evacuating holes. Additional holes in the circuit board may be cleared of solder by heating them from the top side of the printed circuit board and when the solder in such hole or holes is molten the vacuum is again reapplied.

When the solder exits the holes of the printed circuit board it atomizes, thereby breaking up from a molten liquid mass into a plurality of fine particles. This action is caused by the fact that air rushing through the holes to satisfy the vacuum moves faster than the heavy mass of the solder. Owing to their fine size the atomized solder particles created cool quickly and solidify. The filter member 58 captures the solidified particles.

Since the top surface 60 of the filter element 58 is relatively close to the bottom surface of the printed circuit board the atomized solder droplets stick to the top surface of the filter as they cool. In addition, the filter surface 60 being cooler than the solder contributes even more to the solidification of the solder by acting as a chill plate. As more and more solder collects on the top surface 60 of the filter element 58 the air flow pattern changes from primarily occurring through the top surface to occurring through the exposed sidewall surface. However, the solder continues to collect on the ever-growing chill plate surface 60. This phenomenon continues until it is no longer practical to allow additional solder to build up on the surface 60.

Figure 5A:
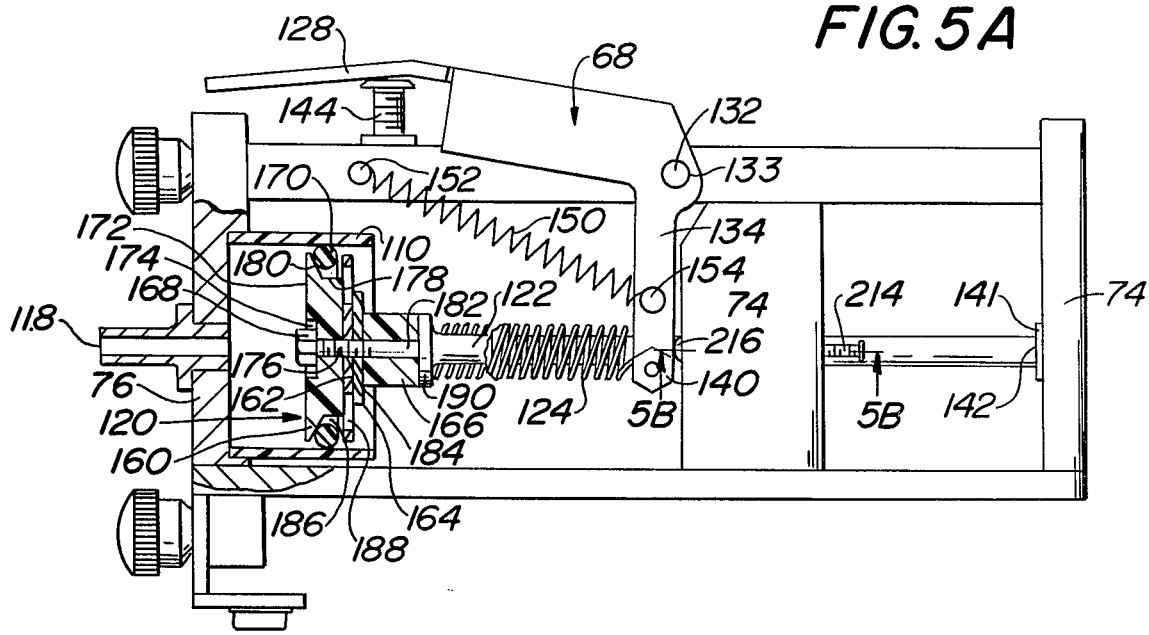
FIG. 5A is an enlarged side elevational view, partially in section, of a portion of the apparatus shown in FIG. 1 immediately after a vacuum has been created thereby.

Referring now to FIGS. 1, 4A and 5A, there is shown the instantaneous vacuum source 36 of the system 20. As can be seen, the vacuum source comprises a frame 62 mounting a piston and cylinder assembly 64, spring actuating means 66, a foot pedal 68, return spring means 70 and a latch assembly 72.

The frame comprises a back plate 74, a front plate 76, a top bar 78 and a bottom bar 80. The top bar 78 and bottom bar 80 are permanently secured to the back plate 74 via plural screws 82 (FIG. 4A). The front plate 76 is adapted for releasable securement to the remaining portion of the frame to provide access to the interior of the piston-cylinder assembly 64, as will be described in detail later. To that end, as can be seen in FIG. 4A, a threaded opening 84 extends longitudinally within top bar 78. An aligned threaded opening 86 extends through the front plate 76. A screw 88 having a knurled head 90 extends through the aligned openings 86 and 84 to secure the front plate to the top bar 78.

A mounting block 92 is secured to the underside of bottom bar 80 at the front end thereof. The mounting block 92 includes a longitudinally extending threaded opening 94. The block 92 with its opening 94 is adapted to mount a supporting leg 96 on the frame 62. The leg 96 is an elongated member having a base portion 98 and an upstanding flanged portion 100. An opening 102 extends through the central portion of the flange 100 and is aligned with the threaded opening 94 in the mounting block 92. A screw 104 having an enlarged knurled head 106 extends through the aligned openings 102 and 94 to secure the leg 96 to the frame 62. Disposed on the underside of the base 98 of the leg 96 are a pair of spaced resilient pads 108 (only one of which to be seen).

The vacuum assembly 36 is arranged to be disposed on the floor with the two spaced pads 108 and the rear portion of the underside of bottom bar 80 forming the floor contact portions of the frame. This triangular support arrangement provides a stable base for the vacuum assembly on the floor.

As can be seen in FIG. 4A, the cylinder-piston assembly 64 comprises a hollow cylinder 110 permanently secured within a circular well 112 in the rear surface of the front plate 76. An opening 114 extends through the front plate 76 at the center of the well 112. A flanged coupling 116 is permanently mounted within the opening 114. The front end 118 of the coupling is adapted to be received within the hollow interior of the end of the conduit 38 remote from the vacuum cup assembly 34.

A piston assembly 120 is disposed within the cylinder 110. The piston assembly is arranged to be reciprocated from the position shown in FIG. 4A to the position shown in FIG. 5A under the force produced by the spring means 66. As will be appreciated by those skilled in the art, this action produces a vacuum within the cylinder in front of the piston assembly 120.

The piston assembly 120 includes a piston rod 122 which extends into and through the latch mechanism 72. The spring means 66 comprises a pair of helical tension springs 124.

The foot pedal 68 is an elongated member comprising a lever portion 126 terminating in an enlarged foot contact portion 128 at the free end thereof. The portion 126 includes a pair of side walls 130 bent at an angle thereto to strengthen the foot pedal. The pedal 68 is mounted to the frame for pivoting movement about a horizontal axis, via a pivot shaft 132. The pivot shaft extends through a horizontal passageway 133 in the top bar 78 of the frame 62 and through aligned openings in the side walls 130 of the foot pedal 68. A respective arm 134 projects downward from each side wall 130 of the foot pedal 68. Each arm is adapted to be connected at its free end to one end of an associated spring 124 of spring means 66. The other end of each spring 124 is connected to the piston assembly 120, via a mounting block to be described later.

The connection of each spring 124 to the end of its associated arm 134 is accomplished via a screw 136 extending through an opening 138 at the free end of the arm. A nut 140 (FIG. 5A) is threadedly engaged on the screw 136 to secure the spring end.

As will be appreciated by those skilled in the art, when the foot pedal 68 is depressed by applying a force to portion 128 the downard pivot action causes the projecting arms 134 to move away from the cylinder 110. The latch assembly 72 enables the piston to move to the rear slightly (for a reason to be described later) and then locks the piston rod 122 in place so that the piston assembly 122 remains at the position shown in FIG. 4A. Since the piston is held in position by the latch assembly 72 the continued pivoting of arms 134 effects the tensioning of the associated springs 124.

As will be described in detail later, one of the arms 134 is adapted to make contact with an actuator or plunger of the latch assembly to release the latch when the foot pedal 68 is fully depressed. The unlatching of the latch assembly 72 frees the piston rod 122 and the piston connected thereto so that the piston instantly is pulled down the cylinder 110 to the position shown in FIG. 5A by the springs 124. This action creates a vacuum within the cylinder almost instantaneously.

As can be seen in FIG. 4A, an energy absorbing bumper 141, preferably formed of a resilient material, such as rubber, is mounted on the inner wall of back plate 74. The energy absorbing bumper 141 stops the rearward movement of the piston by acting as a stop to the free end 142 of the piston rod.

An adjustable stop 144 is mounted on the top bar 78 under the enlarged foot rest portion 128 of the foot pedal 68. The stop 144 serves to prevent the foot pedal 68 from being depressed too far. To that end, the stop 144 comprises a screw 146 mounted in a hole 148 in the top bar 78.

In order to return the piston assembly 122 to the position shown in FIG. 4A to ready the system for repeated operation return spring means 70 is provided. The return spring means comprises a pair of helical tension springs 150. Each spring has one end connected to the top bar 78 via a projecting shaft 152. The other end of each spring is connected to an associated arm 134 of the foot pedal 68, via an associated projecting pin 154. As should thus be appreciated, when the foot pedal is released after the piston has moved to the rear position shown in FIG. 5A the springs 150 are stretched to their maximum displacement. The latch mechanism 72 does not lock the piston rod at this time so that when the foot pedal is released the return springs pull on the pins 154 to rotate the foot pedal 68 upward from the position shown in FIG. 5A to the position shown in FIG. 4A, whereupon the system is ready for renewed operation.

As will be appreciated from the foregoing, the cylinder 110 of the piston-cylinder assembly 64 includes no valves or moving parts and is completely open at one end to provide means for complete removal of the piston assembly 120 for ease of cleaning.

This is accomplished by loosening screw 88 and removing front plate 76. The piston assembly 120 is clearly shown in FIG. 5A and basically comprises a piston 160, a piston vent plate 162, a piston washer 164, a mounting T-block 166, a mounting nut 168 and a resilient O-ring 170. As can be seen, the piston 160 is a disc-like member whose outside diameter is less than the inside diameter of cylinder 110. The front face 172 of the piston is planar and includes a centrally located well 174 through which a central opening 176 extends. The outer periphery of the piston includes a ledge 178 and a bevelled wall 180. The piston is secured on the end of the piston rod 122 via a threaded portion 182 extending through opening 176 in the piston. A mounting nut 168 secures the piston onto the threaded end of the piston rod. The piston vent plate is a planar disc-like member having a central opening 184 through which the threaded portion 182 of the piston rod 122 extends to hold the vent plate in place. With the vent plate mounted on the piston rod as described an annular channel 186 is created in the periphery of the piston assembly betweem wall 180 and vent plate 162.

Figure 7:
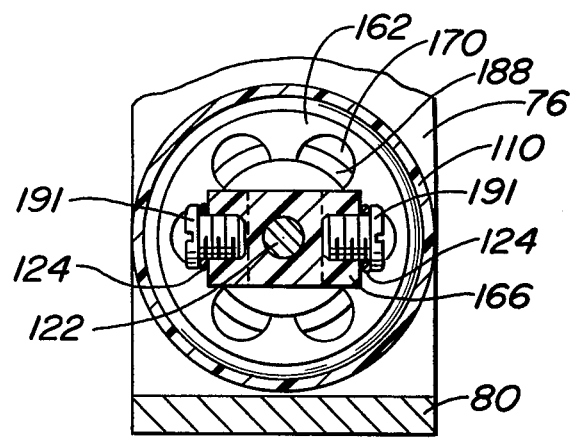
FIG. 7 is a sectional view taken along line 7—7 of FIG. 4A.

As can be seen clearly in FIG. 7, the vent plate includes a plurality of vent holes 188 extending therethrough. The vents are equidistantly spaced from one another and are located radially of the central opening 184 by a predetermined distance so that each vent communicates with the channel 186 formed between the vent plate and the piston. The washer 164 includes a central opening 190 through which the end 182 of the piston rod extends.

The mounting block 166 is of a generally T-shape and includes a central opening through which the end 182 of the piston extends, with the block 166 being held in place between the washer 164 and a flange 190 of the piston rod 122. Each of the springs 124 is connected to the block 166 via associated screws 191.

The O-ring 170 is seated within the channel 186. The outside diameter of the O-ring is of the same dimension as the inside diameter of the cylinder 110 to form a seal therebetween. The inside diameter of the O-ring is greater than the outside diameter of the ledge portion 178, that is the bottom wall of the channel 186. The O-ring is movable longitudinally within channel 186 such that it can make contact with the flared surface 180 of the piston to create a seal in the cylinder (see FIG. 5A) necessary during the creation of a vacuum or can contact the inside surface of the vent plate away from the tapered surface of the piston to vent the cylinder during the return of the piston to the position shown in FIG. 4A.

In accordance with a preferred aspect of this invention a silicone grease is used on the O-ring 170 to aid it in its sealing function during the creation of the vacuum.

Operation of the vacuum source 36 as described heretofore is as follows: assuming that the foot pedal 68 is in its normal rest position as shown in FIG. 4A, the return springs 150 provide a pull on the arms 134 towards the cylinder to cause the piston assembly 120 to be fully extended in the cylinder 110. At this time the O-ring 170 is within channel 178 but is out of contact with the tapered wall 180 of the piston. Accordingly, an air passageway exists from the interior of the cylinder, that is the portion in front of the piston, between the O-ring and the tapered surface 180, the channel under the O-ring, and through a communicating vents 188 in the vent plate 162 to the ambient air outside the cylinder.

When it is desired to create a vacuum the foot pedal 68 is depressed by the application of a force to the plate portion 128. This causes the foot pedal 68 to pivot downard about pin 132. The pivoting action of the foot pedal is coupled, via the arms 134 and connected tension springs 124, to the piston assembly 120 to cause the piston assembly to start to move to the rear, that is in the direction toward the open end of the cylinder. The latch assembly 72, as will be described in detail later, permits the piston rod and the connected piston assembly to move rearwardly only a slight distance before locking the piston rod and associated piston in place. The short but initial movement of the piston rod and its associated piston assembly toward the rear of the vacuum source causes the piston to move its tapered wall surface 180 into intimate contact with the mating side wall surface of the O-ring 170. In FIG. 5A the condition wherein the side wall surface of the O-ring is in intimate contact with the tapered wall surface 180 of the piston is shown. This action effects an automatic sealing of the interior of the cylinder via the contact between the outside diameter of the O-ring 170 and the inside diameter of the cylinder 110 and the intimate contact between the bevelled surface 180 of the piston and the mating side wall surface of the O-ring 170. Once the piston has completed the short travel and is locked in place by the latch means 72 continued downward depression of the foot pedal 68 effects the loading or stretching of the springs 124.

In order to ensure that the above described sealing operation occurs repeatedly and reliably each time that the apparatus is operated the latch assembly 72 is arranged to enable the piston rod to travel a distance to the rear which is greater than the difference between the width of the piston channel 178 and the cross-sectional diameter of the O-ring.

When the foot pedal is fully depressed the head of one of the screws 136 connecting the spring to the associated arm 134 makes contact with a trip mechanism or plunger, to be described in detail later, of the latch mechanism 72. This action releases the latch machanism, whereupon the piston rod and associated piston assembly is immediately freed to move to the rear and does so instantaneously. The enlarging space within the interior of the cylinder caused by the movement of the piston to the rear creates a vacuum virtually instantaneously. The piston continues down the cylinder until the energy stored in the springs 124 is totally absorbed as the end of the piston rod 142 comes to rest against the bumper 141. This occurs when the vacuum in the cylinder has been satisfied by the atmospheric pressure bleeding through the holes of the printed circuit board which has been evacuated of solder. As the foot pedal 68 is released the springs 150 attempt to restore the vacuum source to its normal rest position shown in FIG. 4A by pulling the piston rod in the forward direction to carry the piston back into the cylinder.

During the return movement the O-ring 170 changes position so as to move in the channel 186 away from the bevelled wall 180 and into contact with the vent plate 162 as shown in FIG. 4A. Accordingly, as the piston continues to move into the cylinder the air trapped within the cylinder is enabled to exit through the channel between the O-ring and the piston and the communicating vent holes 188 in the vent plate 162 to the ambient atmosphere. The trapped air in the cylinder continues to escape via that path until the piston assembly is returned to its full at rest position, that is fully extended within the cylinder. When this occurs, the latch assembly 72 relatches the piston rod except for permitting it to move slightly to the rear to seat the O-ring onto the bevelled wall as described heretofore.

As should be appreciated from the foregoing, the valving system of the piston assembly 120 as described heretofore allows very little bleed back pressure to escape via the conduit coupling 116 since the volume of air allowed to escape through the vent holes 188 is so great and the piston assembly travel time period so short, a negligible amount of back pressure is experienced. If the system 20 of the instant invention is to be used in an application that requires absolute bleed back protection, should bleed back occur, it is contemplated to provide suitable valving, e.g., a one-way valve, a flat valve, a ball check valve, etc., at the conduit coupling 116.

Figure 4B:
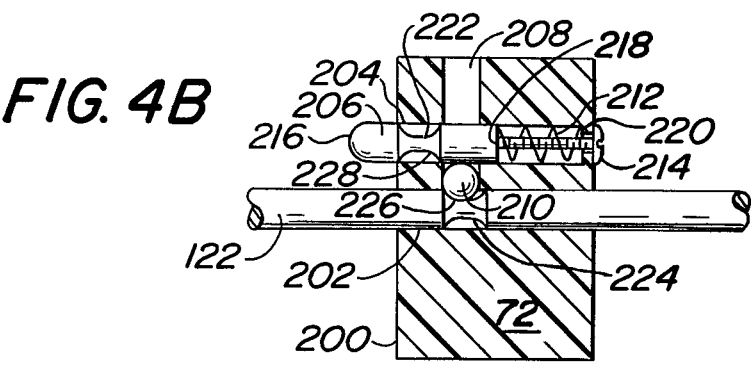
FIG. 4B is a sectional view taken along line 4B—4B of 4A and showing the latch mechanism at said time.
Figure 6:
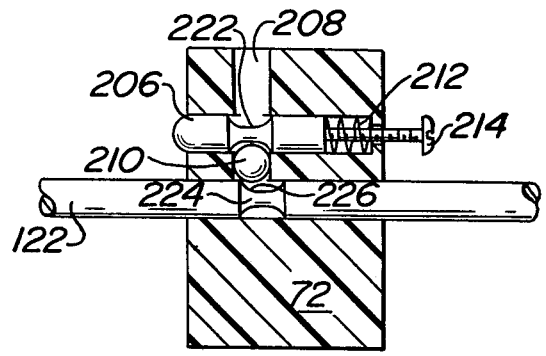
FIG. 6 is a sectional view similar to the views of FIGS. 4B and 5B and showing the latch mechanism at the instant it unlatches to effect the creation of a vacuum.
Figure 5B:
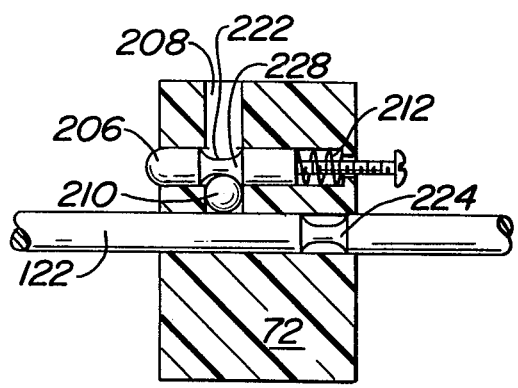
FIG. 5B is a sectional view taken along line 5B—5B of FIG. 5A and showing the latch mechanism at that time.

As can be seen in FIGS. 4B, 5B and 6, the latch assembly 72 basically comprises a block 200 mounted on frame 62 via screws 201 (FIG. 4A), a pair of parallel, longitudinally extending passageways 202 and 204, a trip or plunger 206, a transverse passageway 208, a ball 210, a biasing spring 212 and a retaining screw 214. The block 200 is preferably formed of a plastic material, such as Nylon. The passageways 202 and 204 extend entirely through the block, with the rear portion of the piston rod 122 extending through the passageway 202. The plunger 206 is disposed within the passageway 204. The transverse passageway 208 intersects passageways 202 and 204. The ball 210 is preferably formed of a very hard material, such as steel, and is disposed within the passageway 208 between the longitudinally extending passageways 202 and 204.

The plunger 206 is a short rod-like member having a domed actuating end 216. At the opposite end 218 there is a threaded hole in which the end of retaining screw 214 is disposed. The passageway 204 terminates in a reduced diameter portion 220 in the back wall of the block 72 to form a shoulder. The plunger 206 is normally biased to the position shown in FIG. 4B, i.e., to extend its maximum distance outside of block 200, by the compression of spring 212. To that end, the spring 212 is disposed within passageway 204 between the end 218 of the plunger 206 and the shoulder formed by the reduced diameter portion 220 of passageway 204. The reduced diameter portion of the passageway is of sufficient diameter to accommodate the shank of screw 214 but smaller than that of the screw's head, which lies outside of the block 200. Accordingly, the plunger 206 is precluded from completely exiting passageway 204 by the screw head 214 making contact with the back wall of the block 200.

The plunger 206 includes an arcuate chamfered recess 222 cut about its periphery. The annular recess 222 is located at a longitudinal position on the shank of the plunger such that when the plunger 206 is pushed into the passageway 204 the annular recess 222 aligns with the transverse passageway 208. A similar arcuate chamfered recess 224 is cut about the periphery of the piston rod 122 at a longitudinal location such that when the piston is in its fully extended position within cylinder 110 the annular recess 224 also aligns with the transverse passageway 208.

As can be seen in FIGS. 4B, 5B and 6, the width of both annular recesses 222 and 224 are the same and slightly greater than the diameter of the transverse passageway 208 and the ball 210. This slight extra width permits the latch mechanism 72 to enable the piston rod 122 to move to the rear slightly (by the dimension of the extra width) at the start of an operation cycle of the vacuum source while locking the piston rod in place after said short movement. The slight movement of the piston rod is necessary to effect the movement of the O-ring 170 from the position shown in FIG. 4A to a position, like that shown in FIG. 5A to seal the cylinder so that it can produce the vacuum.

In FIG. 4B the latch assembly 72 is shown in the condition wherein the piston rod 122 is locked against further movement, i.e., the position immediately after the piston rod has moved slightly to the rear by the excess width of its groove to seal the cylinder.

Accordingly, in the position shown in FIG. 4B, the ball 210 is located in the transverse passageway 208 with a portion thereof extending into the annular recess 224 of the piston shaft 122 in the passageway 202. The ball is held in this position and precluded from exiting the recess 225 by the location of an unrecessed shank portion of the plunger 206 within the transverse passageway 208.

Once the foot pedal 68 of the vacuum source has been fully depressed, thereby having tensioned the springs 124 to their maximum, the head of screw 136 makes contact with the domed free end 216 of plunger 206. This action pushes the plunger into the passageway 204 against the opposition of spring 212. When the annular recess 222 of the plunger is aligned with passageway 208 the pressure applied to ball 210 by the forward chamfered surface 226 of recess 224 forces the ball out of the recess 224, through transverse passageway 208, and into the aligned recess 222. The movement of ball 210 out of recess 224 frees the piston rod 122, whereupon the pressure built up in the stretched springs 124 instantly moves the piston down passageway 202 toward the back plate. This action instantaneously creates a low pressure or vacuum in the cylinder as described heretofore.

Upon the release of the foot pedal the return springs 150 carry the piston assembly and the connected piston rod all the way into the cylinder, as described heretofore. As the piston rod 122 is moved back to the fully extended position within the cylinder the plunger biasing spring 212 attempts to move the plunger 206 out of passageway 204. This causes the rear arcuate chamfered surface 228 of the annular recess 222 in the plunger 206 to apply a force to ball 210 toward the passageway 202. Accordingly, when the piston rod 122 is in the position wherein its annular recess 224 is aligned with the transverse passageway 208 the ball 210 moves out of recess 222 in the plunger 206 and into the recess 224 in the piston rod 122. This action frees the plunger so that its biasing spring 212 moves it down the passageway 204 to the position shown in FIG. 4B. At the same time the ball 210, being disposed within transverse passageway 208 and within recess 224 holds the piston rod 122 in position, except for enabling the rod to be moved to the rear by the distance equal to the excess width of the recess 224 over the diameter of the ball to enable the O-ring to be displaced as described heretofore to seal the piston.

As should be appreciated from the foregoing, the latch assembly 72 controls the movement of the piston to enable the vacuum source to operative instantaneously. However, it should be pointed out at this juncture that the latch assembly of the instant invention has various other applications separate and apart from the solder evacuation system of the instant invention. In this regard the latch is capable of restricting the movement of tremendous loads while experiencing very little wear since at the point of release every member of the assembly is moving in the direction that releases it of stress and high pressure contact. In addition, even though the latch assembly holds heavy loads the pressure required to release the latch is minimal since the ball-to-plunger contact area is very small and the ball-to-plunger pressure is shared porportionally with the load point, the transverse hole wall contact point and the ball-plunger contact point.

Insofar as the instantaneous vacuum source 36 is concerned, it should be recognized by those skilled in the art that such apparatus, with slight modification, can be used to produce instantaneous air pressure via the conduit 38 to the cup assembly 34 to blow molten solder from the holes in the printed circuit board. Such a modification can be accomplished by mounting the piston and cylinder or diaphragm on the opposite end of the piston rod 122 or by reversing the action of the foot pedal 36 and spring means 66.

Furthermore, it should be appreciated that the system of the instant invention can be modified to provide air pressure and vacuum at the same time via the use of a pair of cylinders and associated pistons, one on each end of the piston rod 122.

The amount of vacuum that the vacuum source 36 can provide is dependent upon the size of the cylinder and matching piston assembly and the energy unleashed in the spring upon the release of the latch mechanism. It has been found that in order to ensure quick and reliable solder evacuation a vacuum of at least six inches (15.24 cm) of mercury is required.

It should also be pointed out at this juncture that while the instantaneous vacuum source shown in the drawing and described herein used in the system 20 is purely mechanical and does not require an external source of air, vacuum or electrical energy source, it is contemplated that the mechanical vacuum source can be replaced by an electrical source, such as a solenoid operated, piston-cylinder, etc., if desired.

Without further elaboration, the foregoing will so fully illustrate my invention that others may, by applying current or future knowledge, readily adapt the same for use under various conditions of service.

What is claimed as the invention is:

1. Apparatus for simultaneously evacuating molten solder from plural holes in a printed circuit board comprising hollow cup means for contacting said circuit board, said cup means including a resilient lip forming a mouth for the interior of said cup means, the entire periphery of said lip contacting and intimately engaging the circuit board to completely encircle the molten solder area and seal said area with said mouth, thereby isolating the molten solder area from the ambient atmosphere, and vacuum generating means for instantaneously generating a vacuum in response to actuation, said vacuum generating means being in communication with said cup means to instantaneously produce a vacuum within said cup means to thereby pull the molten solder from said holes into said cup means.

2. The apparatus of claim 1 wherein said vacuum generating means comprises a hollow cylinder having moveable piston means therein for creating an expandable chamber within said cylinder, said chamber including a port in communication with said cup means, said piston means being connected to first means operative when enabled for instantaneously pulling said piston means through said cylinder to expand said chamber and thereby create said vacuum.

3. The apparatus of claim 2 wherein said first means comprises spring means.

4. The apparatus of claim 3 wherein said vacuum generating means additionally comprises quick-acting latch means coupled to said piston means to enable said piston means to be withdrawn by said spring instantaneously in response to the unlatching of said latch means.

5. The apparatus of claim 4 wherein said piston means includes a rod and wherein said rod includes a chamfered recess cut in a portion of the periphery thereof, said latch means comprising a block having first and second passageways therein, a plunger having a chamfered recess cut in a portion of the periphery thereof and disposed within said first passageway, a third passageway and a ball disposed therein, the portion of the piston rod having the recess therein being disposed within said second passageway, said third passageway communicating with said first and second passageways, said plunger being reciprocable within said first passageway between a second position wherein its recess is aligned with the third passageway to a first position wherein its recess is not aligned with the third passageway, said piston rod being reciprocable within said second passageway between a first position wherein its recess is aligned within the third passageway to a second position wherein its recess is not aligned with said third passageway, the diameter of said ball being greater than the length of the third passageway between said first and second passageways such that when said plunger is in the first position and said piston rod is in said first position a portion of the ball extends into the aligned recess of the piston rod within the second passageway to lock the piston rod in place and when said plunger is moved to said second position the ball moves within the third passageway such that a portion of the ball extends into the aligned recess within the plunger and out of the recess within the piston rod to unlock the piston rod and thereby enable the rod to be moved to its second position.

6. The apparatus of claim 5 wherein said plunger is spring biased so as to normally assume said first position.

7. The apparatus of claim 2 wherein said piston means includes a channel extending about the entire periphery thereof and having a forward bevelled surface and a rear apertured surface, said channel having an O-ring disposed therein for movement into contact with said forward bevelled surface from said rear apertured surface and vice versa, the width of said channel being greater than the diameter of the cross-section of said O-ring, the outside diameter of said O-ring being the same as the inside diameter of said cylinder and the outside diameter of said channel being smaller than the inside diameter of the O-ring.

8. The apparatus of claim 1 wherein molten solder entrapment means is disposed within the interior of said cup means.

* * * * *